3,100,673
DYEINGS AND PRINTS POSSESSING FASTNESS TO WET PROCESSING AND THEIR MANUFACTURE ON CELLULOSE MATERIALS AND PROTEIN FIBERS
Hans Ulmer, Paul Karácsonyi, Kurt Schimmelschmidt, and Edwin Baier, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 26, 1960, Ser. No. 45,272
Claims priority, application Germany Aug. 8, 1959
9 Claims. (Cl. 8—22)

The present invention relates to dyeings and prints possessing fastness to wet processing and their manufacture on cellulose materials and protein fibers.

It is known to use compounds of sulfur dyestuffs and alkali sulfites for dyeing and printing cotton in the presence of alkalies or sulfur alkalies (cf. German patent specifications Nos. 88,392, 91,720, and 94,501) or in the absence of alkalies and reducing agents at raised temperatures (cf. German patent specification No. 1,004,586). The aforesaid compounds are presumably sulfur dyestuffs containing thiosulfate groups.

U.S. patent application Serial No. 23,139, filed on April 19, 1960, by Werner Schultheis, Kurt Schimmelschmidt, Hermann Hoffmann, Edwin Baier and Albert Bode discloses a process for producing dyeings and prints fast to wetness on shaped structures consisting of natural or regenerated cellulose, wherein the said shaped structures are treated with an alkaline agent or an alkaline reducing agent, for example, sodium sulfide, during or after the dyeing, padding or printing of the said structures with a water-soluble organic dyestuff which contains one or more thiosulfuric acid groups and which may contain further hydrosolubilizing groups, with the exception of a sulfur dyestuff.

It has now been found that fast prints and dyeings can be produced with any of the above-mentioned water-soluble organic dyestuffs which contain one or more thiosulfuric acid groups and which may contain further hydrosolubilizing groups—with the exception of sulfur dyestuffs—on shaped structures of natural or regenerated cellulose, protein fibres or mixtures thereof by treating the material after, during or before the application of the dyestuffs with compounds containing thiocarbonyl or mercapto groups, if desired, in the presence of substances which in an aqueous medium have an alkaline reaction or yield hydroxyl ions.

The dyeings and prints which have thus been prepared excel the dyeings and prints produced with the known compounds of sulfur dyestuffs and alkali sulfites in their fastness to wet—this is in particular true of the dyeings and prints produced with those of the dystuffs to be used in the process of the invention which do not contain any water-solubilizing group in addition to the thiosulfuric acid groups—as well as in their brilliancy.

The water-soluble dyestuffs containing one or more thiosulfuric acid groups, which are suitable for use in the process of the present invention may, for example, belong to the azo, anthraquinone, vat, acridone, phenazine, dioxazine, diphenyl-methane, triphenyl-methane, nitro or phthalocyanine series. The thiosulfuric acid groups may be directly bound to the aromatic nucleus of the dystuff molecule or via a bridge consisting of an aliphatic or aromatic hydrocarbon radical which, if desired, may be substituted, or interrupted by hetero atoms. If desired, the dyestuffs may contain, in addition to thiosulfuric acid groups, further groups imparting solubility in water, such, for example, as sulfonic or carboxylic acid groups. They may be prepared, for example, by coupling diazotized aromatic amines containing thiosulfuric acid groups with any desired coupling components which, on their part, may contain thiosulfuric acid groups, or by condensing dyestuffs containing reactive halogen atoms with aliphatic or aromatic amines containing thiosulfuric acid groups.

The use of compounds containing thiocarbonyl or mercapto groups has many advantages over the addition of sodium sulfide which at room temperature forms sparingly soluble deposits with some of the dystuffs containing thiosulfuric acid groups. It is, for example, possible to add the above-mentioned compounds to the printing colours and dyebaths without running the risk that they form a deposit with the dyestuff used, for the printing colours and dyebaths thus prepared are completely stable at room temperature. The above-mentioned compounds are consequently particularly suitable for dyeing processes using one bath. Besides, the direct addition of the above-mentioned compounds to the printing colour and the stability of the printing colour at room temperature enable the dyestuffs used which contain thiosulfuric acid groups to be applied together with dyestuffs of other classes. Owing to this fact the field in which the dyestuffs containing thiosulfuric acid groups may be applied in the textile printing industry is enlarged. Moreover, the above-mentioned compounds may partially be used for the permanent fixation of the above-mentioned dyestuffs without the addition of a substance giving an alkaline reaction or a compound having but a weakly alkaline reaction, for example, sodium bicarbonate. This is of essential importance with respect to the sensibility to alkali of protein fibres such as wool and silk.

As compounds containing thiocarbonyl or mercapto groups there may be used, for example, thioacetamide, xanthogenates such as alkali-alkyl-xanthogenates, for example, potassium amyl-xanthogenate, potassium hexyl xanthogenate, secondary sodium butyl xanthogenate, potassium butyl xanthogenate, sodium ethyl xanthogenate, sodium isopropyl xanthogenate or potassium ethyl xanthogenate, thiourea or the N-monoalkyl or N,N'-dialkyl thiourea compounds, in which the alkyl groups contain 1 to 6 carbon atoms, mercapto benzothiazoles, the metal salts thereof such as the zinc salt of 2-mercapto benzothiazole, dithiocarbamine derivatives such as N-cycloalkyl-alkyl-ammonium cycloalkyl-alkyl-dithiocarbamates, and thiuram compounds such as dialkyl diphenyl thiuram disulfides.

As compounds which in an aqueous medium have an alkaline reaction or yield hydroxyl ions there may be added in the process of the invention, for example, sodium hydroxide, sodium bicarbonate and the sodium salt of trichloracetic acid.

According to the present invention the permanent fixation of the dyestuffs containing thiosulfuric acid groups is in general brought about in the following way: The prints or dyeings which are first prepared and which contain already the compounds used according to the invention are subjected to a heat treatment at an elevated temperature, for example, a steaming process or a treatment with hot air.

The steaming can be carried out in the usual manner in a continuous steaming apparatus or, for example, in a star steamer, preferably at temperatures within the range of about 100° C. to 110° C. The treatment with hot air, which is also called "thermosol" process, is advantageously carried out by subjecting the material for 1 to 10 minutes to a dry heating at temperatures within the range of about 100° C. to 180° C. In this case the temperature has in general to be the higher the shorter the period of heating.

In some cases it is possible to subject the material to be printed or dyed to a pretreatment with the thiocarbonyl or mercapto compounds or to subject the printed or dyed material to an after-treatment with the said compounds.

The treatment with the thiocarbonyl or mercapto compounds may be carried out in one of the following ways which are given by way of example only:

(a) A tissue is printed with a printing colour which contains both the dyestuff and the compound containing thiocarbonyl or mercapto groups and which may also contain a compound which in an aqueous medium gives an alkaline reaction or yields hydroxyl ions. The material is then dried and steamed.

(b) A tissue is printed with a printing colour which contains the dyestuff but which does not contain the compound containing the thiocarbonyl or mercapto groups. The printed material is passed through a padding liquor which contains the compound containing thiocarbonyl or mercapto groups and which may also contain a compound having an alkaline reaction. The material is the dried and steamed.

(c) A tissue is pretreated with a padding liquor which contains the thiocarbonyl compound or the compound containing the mercapto groups. After an intermediate drying the tissue is printed with a printing colour which contains the dyestuff and which may also contain an auxiliary printing agent, for example, urea. After another intermediate drying the material is steamed.

(d) The material is padded with a padding liquor which contains the dyestuff, the compound containing thiocarbonyl or mercapto groups and, if desired, a compound having an alkaline reaction. The material is intermediately dried and then steamed. In this way a so-called padded drying is obtained.

(e) This mode of operating is in principle carried out as described sub(a) but instead of a natural thickening agent an emulsion thickener that is resistant to electrolytes is used and the printing is subjected to a dry heat treatment, for example, at 120° C., instead of to a steaming process.

The prints and dyeings that can be produced by the process of the present invention on shaped structures of cellulose materials and protein fibers or mixtures thereof distinguish themselves by good fastness properties.

The following examples serve to illustrate the invention but they are not intended to limit it thereto.

*Example 1*

40 grams of a dyestuff which had been prepared by the condensation of copper-phthalocyanine trisulfochloride with 3 mols of 2-amino-ethyl thiosulfuric acid were stirred with 50 grams of urea and dissolved in 300 grams of hot water. After cooling to room temperature 40 grams of thioacetamide were added to the solution. The solution was then mixed with 400 grams of a neutral alginate thickener of 4% strength. The printing colour was then adjusted to 1000 grams by the addition of water or alginate thickener. The printing colour was printed in the usual manner on cotton fabric and the print was dried and steamed for 10 minutes. Subsequently it was mixed, soaped in hot water and rinsed again. A blue print of generally good fastness properties was obtained.

Instead of acetamide, thiourea, monomethyl- or dimethyl-thiourea can be used with the same success.

Instead of cotton fabric, chlorinated wool or natural silk can be printed.

*Example 2*

40 grams of the dyestuff mentioned in Example 1 were mixed with 50 grams of urea and dissolved in 300 grams of hot water. After cooling to room temperature 400 grams of a neutral alginate thickener of 4% strength were added to the solution and the printing colour was adjusted to 1000 grams by the addition of water or alginate thickener. The printing colour was printed on cotton fabric in usual manner, dried and passed at room temperature through a padding liquor consisting of 10 grams of thioacetamide, 20 grams of sodium hydroxide solution of 32.5% strength, 200 grams of common salt and 770 grams of water. After a padding operation and a subsequent short intermediate drying the material was steamed for 10 minutes. It was then rinsed, soaped in hot water and rinsed again. A blue print of generally good fastness properties was obtained.

*Example 3*

Contrary to the procedure described in Example 2 in which the printed material was aftertreated by padding, the material to be printed was pretreated in this experiment with the padding liquor described in Example 2 and after an intermediate drying it was printed with the printing colour according to Example 2. The subsequent treatment was likewise carried out in the manner described in Example 2 and yielded the results described in Example 2.

*Example 4*

40 grams of the dyestuff described in Example 1 were stirred with 50 grams of urea and dissolved in 300 grams of hot water. After cooling to room temperature 20 grams of 2-mercapto-benzthiazole and 20 grams of sodium hydroxide solution of 10% strength were added to the solution. 400 grams of neutral alginate thickener of 4% strength were stirred into the solution. The printing colour was adjusted to 1000 grams in the usual manner by the addition of water or alginate thickener. The printing colour was printed as usual on cotton fabric and the print was dried and steamed for 10 minutes. The material was then rinsed, soaped in hot water and rinsed again. A blue print having generally good fastness properties was obtained.

*Example 5*

The 2-mercaptobenzthiazole used in Example 4 was replaced by the same quantity by weight of the zinc salt of 2-mercaptobenzthiazole and the same results as in Example 4 were obtained.

*Example 6*

The 2-mercaptobenzthiazole used in Example 4 was replaced by the same quantity by weight of N-cyclohexylethyl ammonium cyclohexylethyl dithiocarbamate. The same results as in Example 4 were obtained.

*Example 7*

The 2-mercaptobenzthiazole mentioned in Example 4 was replaced by the same quantity by weight of dimethyl diphenyl thiuram-disulfide. The same results as in Example 4 were obtained.

*Example 8*

30 grams of a dyestuff which had been prepared by coupling 3 mols of 3-aminobenzene-sulfonyl-(methylamino)-β-ethyl-thiosulfuric acid with the reaction product of nickel phthalocyanine trisulfochloride and 3 mols of 1-(4'-aminophenyl) - 3 - methylpyrazolone - (5) were mixed with 50 grams of urea and dissolved with 300 grams of hot water. The solution was cooled to room temperature whereupon 50 grams of thiourea and 10 grams of sodium bicarbonate were introduced into it. Then 400 grams of a neutral alginate thickener of 4% strength were added and the total mixture was adjusted to 1000 grams by the addition of water or alginate thickener. The product thus prepared was printed in the usual manner on cotton fabric. The material was then dried and steamed for 5 to 10 minutes until it was neutral. It was then rinsed, soaped in hot water and rinsed again. A green print of a very good fastness to wet was obtained.

Instead of cotton fabric a tissue of half-wool, wool or silk can be printed.

*Example 9*

30 grams of a dyestuff which had been prepared by coupling 3 - aminobenzene-sulfonyl-(methylamino)-β-ethyl-thiosulfuric acid with 3-(2',3'-hydroxynaphthoylamino)-4-methoxy-benzylthiosulfuric acid were dissolved in 300 grams of hot water. After cooling to room temperature 50 grams of thiourea and 10 grams of sodium bicarbonate were added to the solution. Subsequently 400 grams of neutral alginate thickener of 4% strength were stirred into the solution. By the further addition of water or alginate thickener the printing colour was adjusted to 1000 grams. The printing colour was printed in the usual manner on cotton fabric, the print was dried and steamed for 5 to 10 minutes until it was neutral. Then the material was rinsed, soaped in hot water and rinsed again. A red print of a very good fastness to wet was obtained.

Instead of cotton fabric a tissue of half-wool, wool or silk can be printed.

Example 10

Cotton fabric was padded at room temperature with a solution prepared in the following way: 40 grams of the dyestuff described in Example 1 were dissolved in 50 grams of urea and 400 grams of hot water. After the solution had cooled to room temperature 50 grams of thiourea and 20 grams of sodium bicarbonate were stirred into it. After the addition of 50 grams of neutral alginate thickener of 4% strength and of 10 grams of the sodium salt of m-nitrobenzene-sulfonic acid the padding liquor was adjusted to 1000 grams. After the padding, the material was dried for a short time, steamed for 5 to 10 minutes until it was neutral and then rinsed, soaped in hot water and rinsed again.

A blue padded dyeing of generally good fastness properties was obtained.

Instead of the cotton fabric a tissue of half-wool, wool or silk can be dyed in the manner described above.

Example 11

Cotton fabric was padded at room temperature with the solution prepared in the following way: 30 grams of the dyestuff described in Example 9 were dissolved with 50 grams of urea and 400 grams of hot water. After cooling to room temperature 50 grams of thiourea and 20 grams of sodium bicarbonate were added. Then 50 grams of neutral alginate thickener of 4% strength and 10 grams of the sodium salt of m-nitrobenzene-sulfonic acid were stirred into the solution. The padding liquor was adjusted to 1000 grams by the addition of water. After the padding the material was intermediately dried for a short time and subsequently steamed for 5 to 10 minutes, then rinsed, soaped in hot water and rinsed again. A red padded dyeing of good wet fastness properties was obtained.

Instead of cotton fabric tissues of half-wool can be padded and dyed successfully in the above-described manner.

Example 12

40 grams of the dyestuff described in Example 1 were stirred with 50 grams of urea and dissolved in 300 grams of hot water. After cooling to room temperature 50 grams of thiourea and 400 grams of neutral alginate thickener of 4% strength were introduced into the printing colour which was adjusted to 1000 grams by the addition of further quantities of water or alginate thickener. The printing colour was printed in the usual manner on cotton fabric, which was then dried and steamed for 10 minutes until it was neutral, rinsed, soaped in hot water and rinsed again. A blue print of generally good fastness properties was obtained.

Example 13

40 grams of the dyestuff described in Example 1 were dissolved in 50 grams of urea and 300 grams of hot water. After the solution had cooled to room temperature 50 grams of potassium ethyl xanthogenate and 400 grams of neutral alginate thickener of 4% strength were introduced into it. Water or alginate thickener were added to the printing paste until its weight amounted to 1000 grams. The piece goods of cotton fabric that had been printed and dried in the usual way were then steamed for 5 to 10 minutes until they were neutral, rinsed, soaped in hot water and rinsed again. A blue print of generally good fastness properties was obtained.

Example 14

40 grams of the dyestuff described in Example 1 were mixed with 50 grams of urea and dissolved in 300 grams of hot water. The solution was cooled to room temperature and 40 grams of sodium isopropyl xanthogenate and 5 grams of sodium bicarbonate were added to it. Then 400 grams of neutral alginate thickener of 4% strength were added to the printing paste. The latter was adjusted to 1000 grams by the addition of water or alginate thickener. The printing colour was printed as usual on cotton fabric and the print was dried, steamed for 5 to 10 minutes until it was neutral, rinsed, soaped in hot water and rinsed again.

A blue print of generally good fastness properties was obtained.

Example 15

30 grams of the dyestuff described in Example 8 were stirred with 50 grams of urea and dissolved with 300 grams of hot water. After the mixture had cooled to room temperature 50 grams of thiourea and 80 grams of a solution of 50% strength of the sodium salt of trichloracetic acid were added to it. The mixture was then stirred with 400 grams of neutral alginate thickener of 4% strength. The printing paste was adjusted to 1000 grams by the addition of water and further quantities of alginate thickener.

The printing paste was printed in usual manner on cotton fabric which was then dried, steamed for 5 to 10 minutes, rinsed, soaped in hot water and rinsed again whereupon a green print of a good fastness to wet was obtained.

Instead of cotton fabric a tissue of wool can be printed in an analogous manner.

Example 16

40 grams of the dyestuff described in Example 1 were mixed with 50 grams of urea and dissolved in 300 grams of hot water. After cooling to room temperature 50 grams of thiourea and 10 grams of sodium bicarbonate were added to the solution. Then 500 grams of an emulsion thickener which was stable to electrolytes was introduced into the solution. The printing colour was adjusted to 1000 grams by the addition of water or a further quantity of emulsion thickener. After the printing colour had been printed in usual manner on cotton fabric the printed material was intermediately dried for a short time and then subjected for 5 minutes to thermofixation at 120° C. It was then rinsed, soaped in hot water and rinsed again. A blue print of generally good fastness properties was obtained.

Tissue of half-wool can be printed in an analogous manner.

We claim:

1. A process for producing wet-fast dyeings and prints on shaped articles of a material selected from the group consisting of cellulose, wool, half-wool and silk which comprises treating said shaped articles with a sulfur-containing compound selected from the group consisting of thioacetamide, alkali-alkyl-xanthogenates, thiourea, N-monoalkyl- and N,N'-dialkyl thioureas, the alkyl groups of which contain from one to six carbon atoms, 2-mercapto-benzthiazole, the zinc salt of 2-mercapto-benzthiazole, N-cyclohexylethyl ammonium cyclohexyl ethyl dithiocarbamate and dialkyl diphenyl thiuram disulfides, and a water soluble organic dyestuff of the group consisting of phthalocyanine dyes, copper phthalocyanine dyes, nickel phthalocyanine dyes, pyrazolone dyes and azo dyes, which contain at least one thiosulfuric acid group bound to a carbon atom of an aromatic nucleus of said dyestuffs through a member of the group consisting of —CH$_2$—, —SO$_2$—NH-lower alkylene and

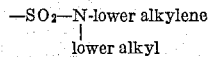

and permanently fixing the resulting dyeings and prints at an elevated temperature.

2. The process as claimed in claim 1, wherein the treatment with a sulfur-containing compound is carried out in the presence of a compound selected from the group consisting of sodium hydroxide, sodium bicarbonate and the sodium salt of trichloracetic acid.

3. The process as claimed in claim 1, wherein the dyestuffs used contain besides the thiosulfuric acid groups further groups imparting solubility in water selected from the group consisting of the sulfonic acid group and the carboxyl group.

4. The process as claimed in claim 1, wherein the treatment of said shaped articles is carried out by means of a printing colour which contains one of said sulfur-containing compounds and one of said dyestuffs containing at least one thiosulfuric acid group.

5. The process as claimed in claim 1, wherein the treatment of said shaped articles is carried out by means of a padding liquor which contains one of said sulfur-containing compounds and one of said dyestuffs containing at least one thiosulfuric acid group.

6. The process as claimed in claim 1, wherein the treatment of said shaped articles is carried out by means of a padding liquor which contains one of said sulfur-containing compounds after the application of one of said dyestuffs containing at least one thiosulfuric acid group on said shaped articles.

7. The process as claimed in claim 1, wherein said shaped articles are treated with a padding liquor which contains one of said sulfur-containing compounds, then dried and subsequently printed with a printing colour which contains one of said dyestuffs containing at least one thiosulfuric acid group.

8. The process as claimed in claim 1, wherein said water-soluble organic dyestuffs containing at least one thiosulfuric acid group are permanently fixed on said shaped articles after the treatment with one of said sulfur-containing compounds by steaming at a temperature between about 100° C. to 110° C.

9. The process as claimed in claim 1, wherein said water-soluble organic dyestuffs containing at least one thiosulfuric acid group are permanently fixed on said shaped articles after the treatment with one of said sulfur-containing compounds by treatment with hot air at a temperature between about 100° C. and 180° C.

References Cited in the file of this patent

UNITED STATES PATENTS

| | | |
|---|---|---|
| 2,180,805 | Felix et al. | Nov. 21, 1939 |
| 2,245,971 | Felix et al. | June 17, 1941 |
| 2,670,265 | Heyna et al. | Feb. 23, 1954 |
| 2,895,785 | Alsberg et al. | July 21, 1959 |
| 2,944,870 | Atkinson et al. | July 12, 1960 |

FOREIGN PATENTS

| | | |
|---|---|---|
| 117,732 | Germany | Feb. 11, 1901 |